E. B. STUART.
VEHICLE FOR WASTE MATERIAL.
APPLICATION FILED APR. 9, 1914.
1,222,337.
Patented Apr. 10, 1917.
4 SHEETS—SHEET 4.
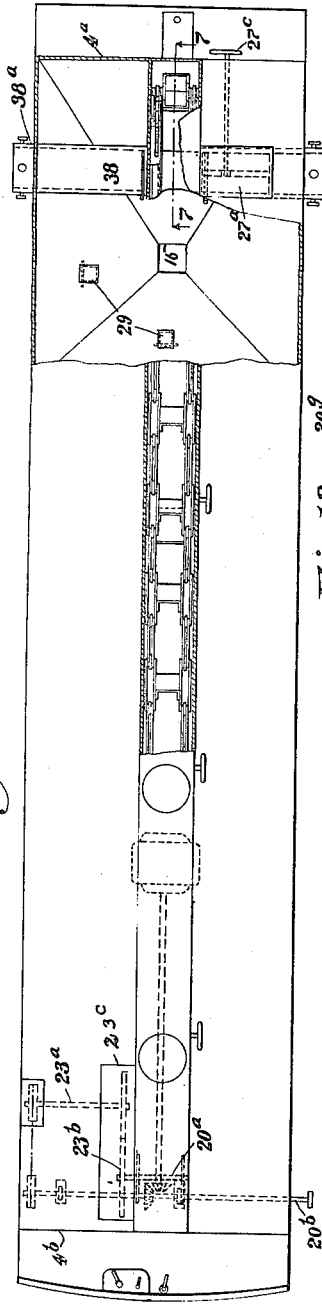
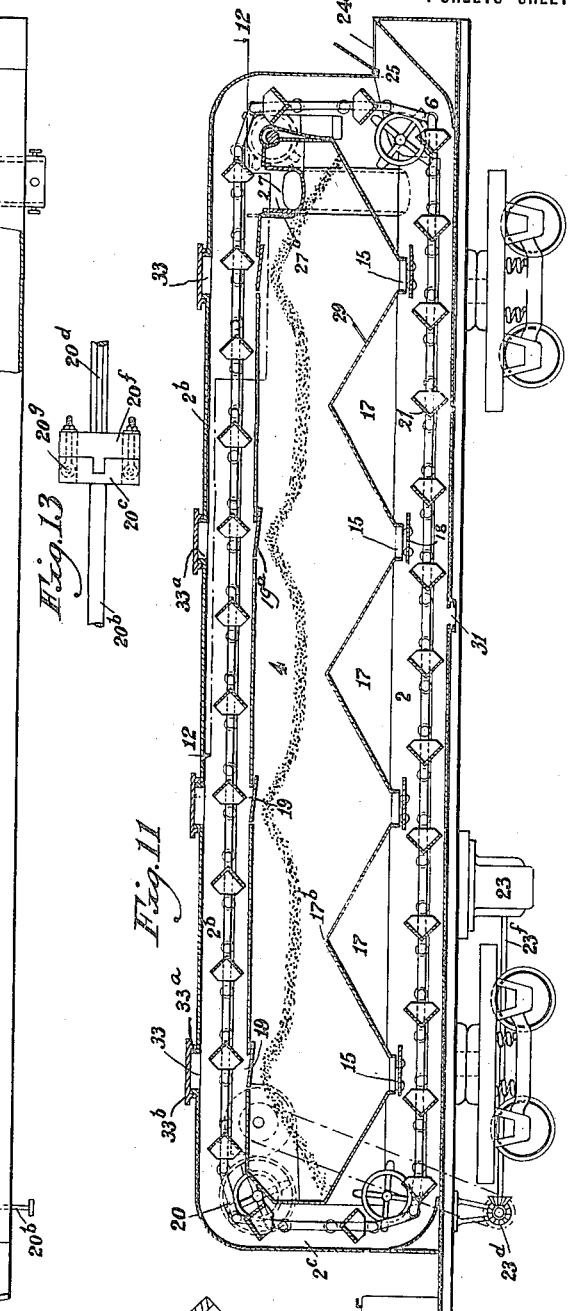
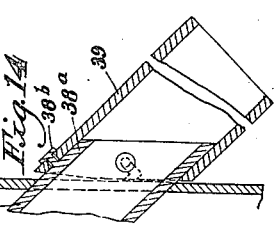
WITNESSES:
INVENTOR
Edwards B. Stuart
BY
ATTORNEY

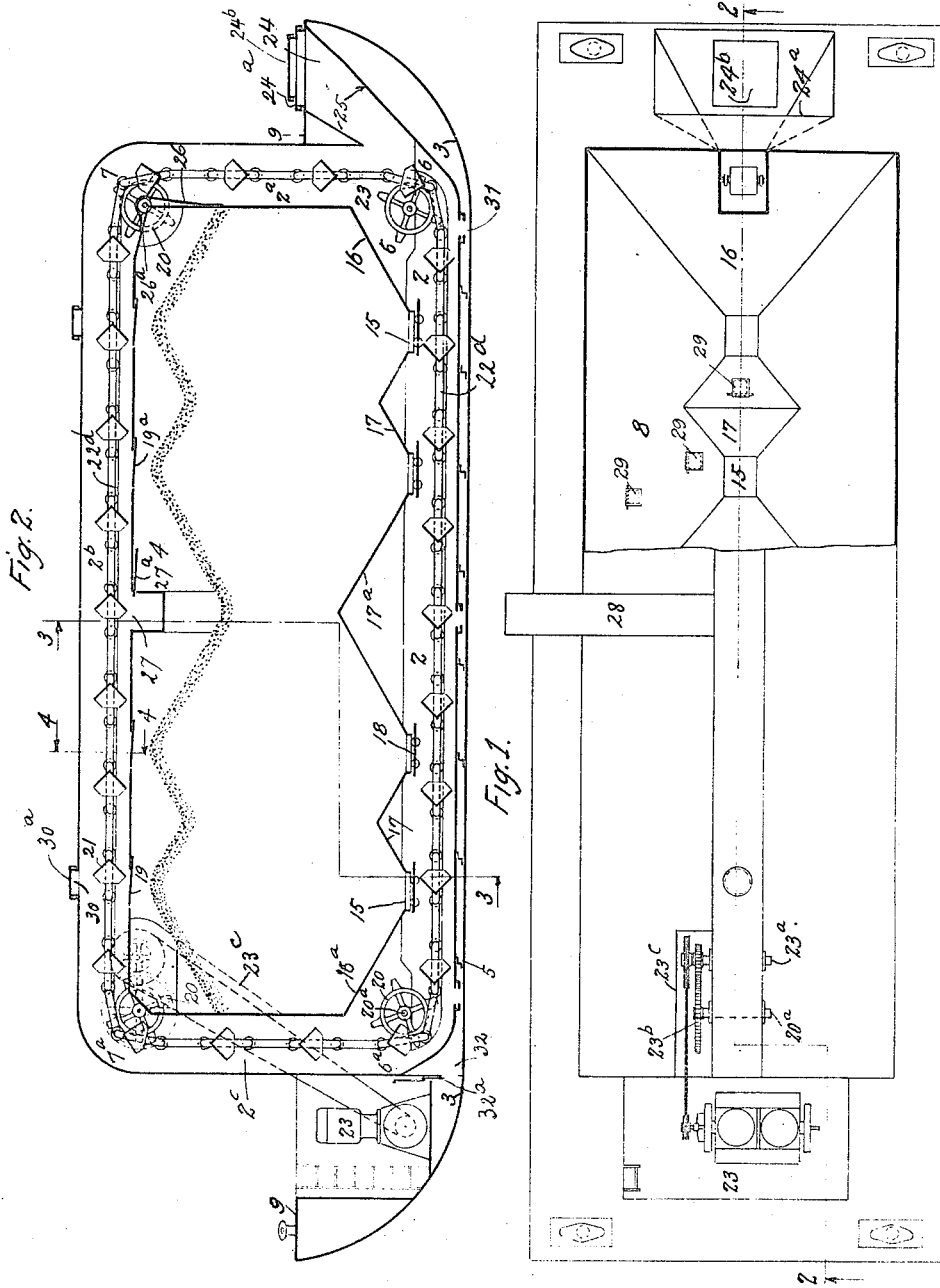
E. B. STUART.
VEHICLE FOR WASTE MATERIAL.
APPLICATION FILED APR. 9, 1914.
1,222,337. Patented Apr. 10, 1917.
4 SHEETS—SHEET 1.

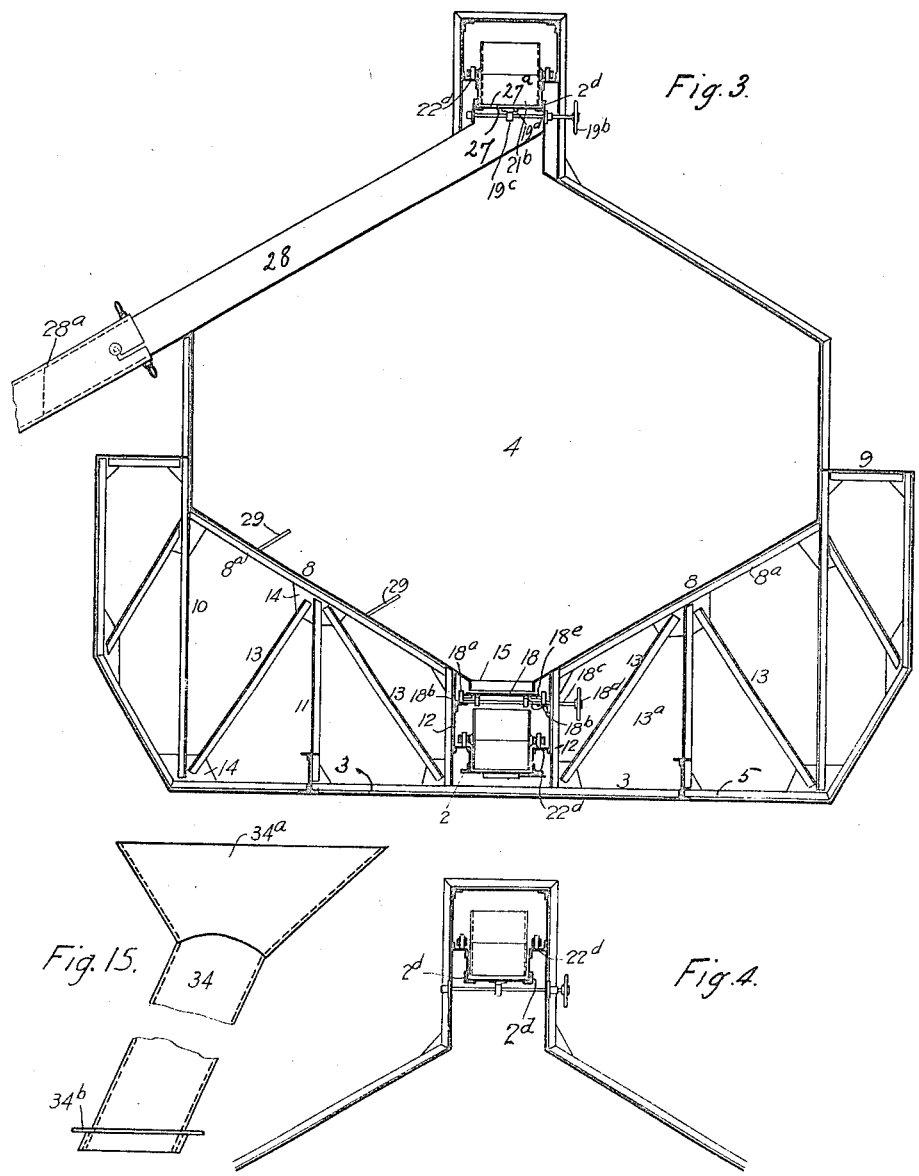

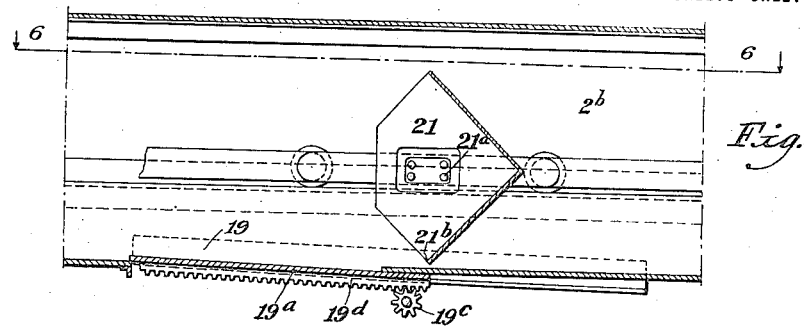
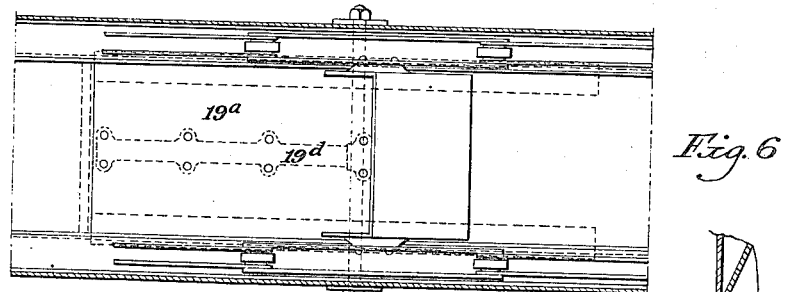
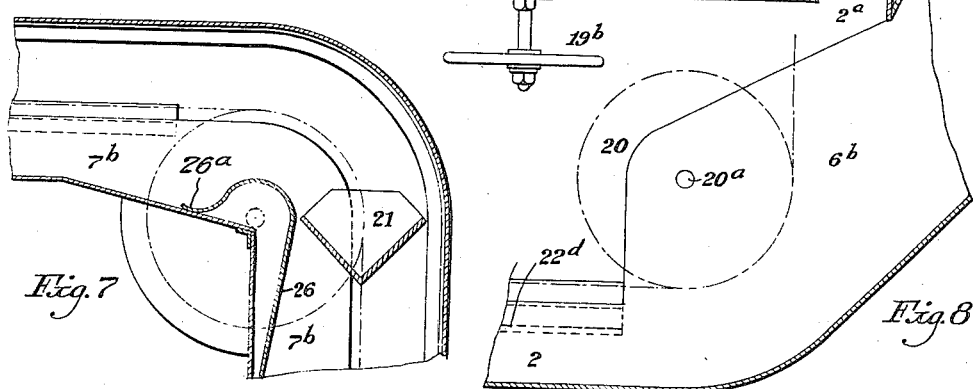
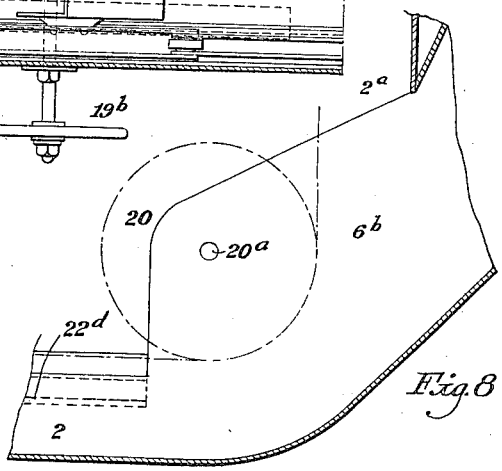
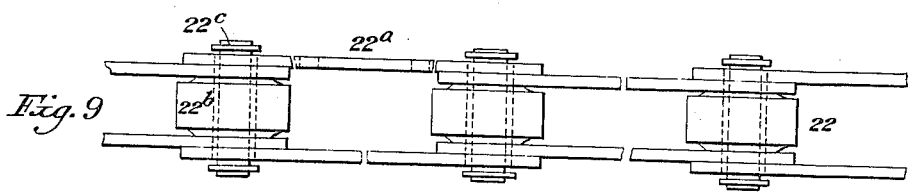
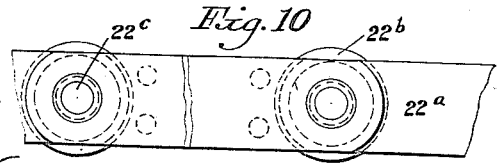

UNITED STATES PATENT OFFICE.

EDWARDS B. STUART, OF CHICAGO, ILLINOIS.

VEHICLE FOR WASTE MATERIAL.

1,222,337.

Specification of Letters Patent.

Patented Apr. 10, 1917.

Application filed April 9, 1914. Serial No. 830,575.

*To all whom it may concern:*

Be it known that I, EDWARDS B. STUART, a citizen of the United States, residing in the city of Chicago, in the county of Cook and State of Illinois, have invented new and useful Improvements in Vehicles for Waste Material, of which the following is a specification.

My invention relates to vehicles for transporting garbage, rubbish, manure, animal offal from the streets, sewage, and all manner of waste material from one point to another, by water or on land. Generally speaking, these vehicles are used mainly for moving material of the character above described from local collection stations, hereinafter designated as loading stations, to central stations for the reduction, utilization or destruction of this material. The latter class of stations will be known as the unloading or discharging stations. A particular object of my invention is to provide vehicles adapted to be loaded and unloaded, preferably by mechanical means, with a minimum contamination of the atmosphere by the effluvia and noxious exhalations commonly emanating from waste material, and the complete suppression of the escape of solid particles of such material from these vehicles while they are in transit or being discharged, and an almost complete suppression of such nuisance while such vehicles are being loaded.

Another object of my invention is to provide means carried by each vehicle for its ready and rapid unloading. Another object is to arrange said vehicles so that they can easily and efficiently be cleaned out and maintained in as nearly sanitary a condition as may reasonably be expected in view of the character of the cargoes handled by these vehicles.

Another purpose of my improvements is the production of a vehicle (either a scow, or a railroad car, or an auto truck) adapted to be used not only for the purposes and with the special advantages above set forth, but also as a local station for receiving waste material collected by garbage wagons and other smaller vehicles, or gathered in receptacles carried by hand.

These objects I attain by the construction and arrangement of parts specified in the following description and illustrated in the accompanying drawings, in which:

Figure 1 is a top plan view of a scow designed to incorporate my inventive idea. In the after part of the scow the deck over the motor for driving the conveyer and the parts above the driving belt, its driven pulley and over the pinion on said pulley shaft, are removed to show the parts of the actuating mechanism. Similarly, over the forward part of the cargo space a part of the trunk and of the sloping deck or eaves is removed to show the inclined planes for feeding the cargo by gravity to the gates of the bottom trunk; Fig. 2, a section on line 2—2 of Fig. 1, looking in the direction of the arrows; Fig. 3, a section on line 3—3 of Fig. 2; Fig. 4, a detail showing in vertical transverse section the upper trunk, the section being taken on line 4—4 of Fig. 2, looking in the direction of the arrows; Fig. 5, a longitudinal, vertical section through a part of the upper trunk, showing a gate with its operating rack and pinion; Fig. 6, a section on line 6—6 of Fig. 5, looking in the direction of the arrows; Fig. 7, a section on line 7—7 of Fig. 12, looking in the direction of the arrows, showing the elbow or turn joining the top of the vertical branch of the trunk to the upper trunk; Fig. 8, a side elevation partly in section, showing in detail and on an enlarged scale the boot formed at the joint between the lower horizontal branch of the trunk and the forward ascending vertical branch; Fig. 9, a plan view of a part of the chain of the bucket conveyer shown in the foregoing views; Fig. 10, a side elevation of the chain shown in Fig. 9; Fig. 11, a vertical, longitudinal section through the middle of the body of a street car constructed and equipped in accordance with the present invention, the parts underneath the floor of the car being shown in side elevation; Fig. 12, a plan view of the rear half of the car shown in Fig. 11, the forward part of the view being a section on line 12—12 of Fig. 11, looking in the direction of the arrows; Fig. 13, a side elevation of a part of the auxiliary clutch shaft used to transmit power from the loading or discharging station to the driving shaft of the conveyers shown in Figs. 11 and 12; Fig. 14, a vertical, diametrical section through the discharge nozzle of the conveyer shown in Figs. 11 and 12, with a removable chute or extension of said nozzle shipped in place; Fig. 15 is a vertical, diametrical section of a chute for loading land vehicles constructed and designed according to the present invention; this form of chute being especially intended for use with stations from which the garbage is delivered by shoveling.

Referring to Figs. 1 to 4 inclusive, a scow of known construction as to the hull proper, has a trunk 2 of rectangular cross section extending longitudinally along the fore and aft midship line of the interior bottom 3 of the hull in its cargo space 4, but slightly elevated above said inner bottom by frames or angles 5 on which the bottom of the truck rests. At its forward end trunk 2 is developed into a boot 6, from the upper end of which a vertical branch $2^a$ of the trunk, of the same cross section as that of the bottom branch 2, rises to the turn or elbow 7, from the after end of which extends horizontally the upper branch $2^b$ of the trunk to an elbow $7^a$, leading to the vertical return branch $2^c$ of the trunk, which connects with the after end of the lower branch 2 by the lower elbow or boot $6^a$. Above and at the sides of the lower branch 2 of the trunk a floor is built for the cargo space proper, the sides 8, 8 of which slope down to the trunk from a point a short distance below the level of the deck 9 of the scow. The sloping floors 8 rest on angle irons $8^a$ which are suitably braced and supported by vertical members 10, 11 and 12, and diagonal angle irons 13. The ends of all of these struts, braces and ties are secured in a known manner to palms or web plates 14 riveted to the frames of the vessel and to the webs of angle members $8^a$, as the case may be. Openings 15, 15, properly spaced apart in a longitudinal direction, are cut in the ceiling or upper wall of the lower branch 2 of the trunk. Forward and aft of each of these openings 15 the floor of the cargo space is given a second inclination in its lower portion, sloping toward said openings in a longitudinal direction. At the forward and after ends of space 4 the floor slopes upward in the inclined portions 16, $16^a$, a part of which forms the upper and inner wall of the boot provided at each end of trunk 2. Between adjacent openings 15 the above mentioned sloping feature is provided by giving portions of the floor lying between such contiguous openings the contour of the slant sides of prisms 17, $17^a$ having isosceles triangles for their bases, the middle prism $17^a$ being materially larger than the other prisms 17, because being placed at the midship section of the vessel, it has a larger amount of cargo to distribute. Each of the openings 17 is controlled by a horizontal gate 18 supported by rollers $18^a$ running on angle iron tracks $18^b$, $18^b$ (Fig. 3), projecting inwardly from and secured to the vertical struts 12, 12, which serve also to support the sides of trunk 2. Each gate 18 is opened and closed by a rack $18^{e\prime}$ secured under each side of the gate 18 and operated by a pinion on a shaft $18^c$, having a hand wheel $18^d$, accessible from the hollow space $13^a$.

Directly above each opening 15 an opening 19 is cut in the lower wall or bottom of the upper branch $2^b$ of the trunk. Each of these openings 19 is controlled by a gate $19^a$ at a slight inclination to the horizontal (Figs. 5, 6 and 2), and opened or closed by a hand wheel $19^b$ operating a pinion $19^c$ in mesh with the rack bar $19^d$ secured to the back of the gate. At each elbow 7, $7^a$ and each boot 6, $6^a$ of the trunk a pair of sprocket wheels 20 is mounted on a shaft $20^a$ journaled in suitable bearings provided in the side walls of the trunk. The wheels of each pair of these sprocket wheels are within said trunk and close to its side walls so as to leave space between the wheels on each shaft for the passage of a bucket conveyer consisting of a number of buckets 21 of triangular, vertical, longitudinal section, each flat, vertical side of which is rigidly secured by a plate $21^a$ to a link $22^a$ of a chain 22 which is engaged by sprocket wheels 20 (Figs. 9 and 10). Each link $22^a$ is formed by two parallel, flat, rectangular bars, the face of every other link being separated laterally by the width of the bars of the adjacent links and by the width of rollers $22^b$ rotatably mounted on link bolts $22^c$ which also pass through the ends of the bars of adjacent links, forming the means of connecting said links with one another. The rollers $22^b$ run on tracks $22^d$ formed of U-bars or Z-bars riveted to and projecting inwardly from the sides of the trunk, the inner webs of the bars being connected by plating to the longitudinal angle bars $2^d$ extending along the sides of the bottom of the trunk. This construction keeps the entire weight of the conveyer buckets and their loads confined to the tracks $22^d$, which prevents the lower or inner edge $21^b$ of the mouth of the bucket from scraping along and cutting into the bottom or inner walls of the trunk according as the bucket is in a horizontal or a vertical branch thereof.

Any one of the four sprocket wheels may be used for driving the chains 22 but the preferable arrangement is to use the one at the upper elbow $7^a$ on the following side of the conveyer, which is the side toward which the latter moves after discharging its loaded buckets. In Figs. 1 and 2 a motor 23 of any desired type is shown connected by a driving belt to a pulley driving a shaft $23^a$ on which is mounted a pinion meshing with a spur wheel $23^b$ that is mounted on the shaft $20^a$ to which are keyed the driving sprocket wheels 20, 20 that actuate the conveyer. The casing $23^c$ incloses as much of the gearing and of the belt as projects into or passes through the cargo space 4.

A hatch 24 provided in the part of the deck forward of the trunk, and normally closed by cover 24ª has sloping down from it the converging sides 25 of the conduit or chute leading into the forward part of the boot 6. The vessel having been moored alongside a wharf, sea wall or quay of a loading station, the waste material is run into the chute 25, whereby the escape of solid particles of the waste material is entirely eliminated, and the contamination of the atmosphere by escape of foul gases or smells is reduced to a minimum. The gates 18 of all the openings 15 in the lower trunk are now closed and the gates 19ª of the openings 19 in the upper trunk are all opened, and the conveyer is set into operation as the waste material commences to flow in, and gather in the bottom of the boot 6. Each bucket is automatically loaded by being pulled with its open mouth in advance through the accumulation of material in the boot. A short distance forward of the entrance to the boot 6 the tracks 22ᵈ stop as shown in Figs. 2 and 8. In consequence, the bucket will sag down by a certain amount of inevitable slack in the chain, thereby putting its mouth in the most favorable position for receiving the incoming streams of waste material that are sliding down chute 25 as well as for scraping up material that may have gathered at the bottom of the boot. A plate 6ᵇ (Fig. 8) close to each side of the sprocket wheel 20, protects the latter from any contents of the buckets that might be spilled out in making the turn to rise from the boot. In the vertical branch 2ª no tracks are used. As the bucket approaches the top of the branch its inner edge encounters a guide plate 26 the lower end of which is riveted to the inner wall of the trunk. From that point the guide plate 26 slants outward and upward, curving over the shaft 20ª of the upper sprocket wheel in the elbow space 7 terminating in the loose upcurved end 26ª, that is free to slide over the sloping portion of the inner wall of trunk 2ᵇ, so as to yield in case any lumps of the contents of the bucket protrude beyond the edge of its mouth. A plate 7ᵇ (Fig. 7) close to each side of the upper sprocket wheel prevents any contents of the buckets that might be spilled, from interfering with the sprocket wheels. At the end of the upper turn of the track the buckets resume their travel an tracks 22ᵈ, which are again suppressed at the beginning of the elbow 7ª and throughout the vertical, descending trunk 2ᶜ, and in the space 6ª for the lower turn. The arrangement of plates at the latter two turns is similar to that described for the former excepting that the guide plate 26 is not required for the returning elbow 7ª.

At mid-length of the upper branch 2ᵇ of the conveyer trunk a special aperture 27 is provided in the lower wall of the trunk, which is closed and opened by a gate 27ª, similar in construction and operation to the gates 19ª of the other apertures 19 in the bottom of trunk 2ᵇ. Instead of discharging into the cargo space 4 this aperture 26 discharges directly into the inlet or upper end of a discharge chute or trunk 28 the bottom of which rests on the slanting cover or roof covering one side of the cargo space 4. In Fig. 3 the end of chute 28 is shown as extending a short distance beyond the extreme width of the scow. An extension piece 28ª may be put on if necessary, and, if carrying the permanent chute or trunk 28 out beyond the side of the vessel be objectionable, the end may be kept inside of the extreme width and the extension piece correspondingly lengthened.

The scow being fully loaded and brought to a desired position at the discharging station to unload the cargo, the hatch cover 24ª is closed down over the hatch 24 and all the gates 18 are opened, as is also gates 27ª, while the gates 19ª of the upper trunk are all closed.

Upon starting up the motor 23 the conveyer buckets in the lower branch 2 scrape up the waste materials as they run down into the trunk through apertures 15, and carry them to the upper trunk, where the buckets are discharged as they successively come to the opening 27, through which the garbage or other waste material runs out through chute 28 overboard into whatever receiving device may be used. Some classes of waste material are readily run down the incline by gravity alone, in fact the discharge through apertures 15 may be too copious, in which case the gates 18 will have to be partly closed, or some of the openings 15 may have to be closed off altogether to prevent overloading the chain and unduly obstructing the passage of the conveyer. Material of a sticky, agglomerative character tends to gather in compact masses, and will probably have to be assisted mechanically to descend to the openings 15. For this purpose apertures are provided in a number of places in the sloping floor 8, 8 and in the slanting sides of the pyramids 17, 17ª, these apertures being closed automatically by non-return, flap valves 29. When the material clogs fast, the flaps 29 are pushed up from underneath and known shaker rods are introduced through the apertures into the stationary mass of waste material lying overhead.

At suitable positions along the top wall of the upper branch 2ᵇ of the conveyer trunk are openings 30, normally covered by hatch covers 30ª, provided for the introduction of hose or streams of water—and disinfectants if necessary—to clean out the trunks and the cargo space 4. For the latter purpose the hose or streams are brought into the cargo space through the openings 19, and the water is drained off into the lower trunk 2 through openings 15, passing out of the lower trunk into the bilge of the vessel through valves 31 provided in the bottom of the trunk 2. Water accumulating in the bilge under the cargo space, drains into the engine room space through openings 32 at the bottom of the bulkhead which divides the engine room space from the cargo space and a part of which forms the rear wall of trunk $2^c$. A gate valve $32^a$ which can be operated from the engine room controls the passage through each of the openings 32. Any suitable known pumping engine (not shown) may be used to pump the water overboard from out of the bilge under the engine room space.

To enable the scow to be readily loaded from wagons or autocars especially equipped and used for gathering garbage and street sweepings it is advisable to fit a small square opening or hatch $24^b$, provided with the usual hatch cover, in the larger hatch cover $24^a$. Such a collecting wagon provided with a suitable discharge opening in the bottom of its wagon body could be connected by a chute with the inside of the coaming of hatch $24^b$ so that its contents could be discharged into chute 25 without danger of any part thereof escaping to the atmosphere.

While the vessel above described and illustrated in Figs. 1 to 4 inclusive may be built of wood with sheet metal linings for the flooring of the cargo space and for the trunks, it is in every way preferable that the construction be made of steel plates, angles and shapes throughout, excepting the customary wooden planking for the part of the deck 9 on which the crew usually stands.

A vessel constructed and equipped as the one above described and illustrated in Figs. 1 to 10 inclusive is adapted for handling any kind of cargo in bulk, which must be protected against the weather and dust and dirt, such as sugar, cereals, fertilizers and many kinds of chemicals, especially those of a deliquescent nature. Bulk cargoes of a hardy character such as coal, sand, gravel and cement may also be advantageously handled by such lighters. Under special conditions a scow of the above description may advantageously be used as a local receiving station for garbage and other waste material.

In Figs. 11 and 12 are shown a freight car of the type of a street railroad car equipped for receiving, transporting and discharging waste material in accordance with my invention and as nearly alike in design and equipment to the scow above described as the differences of service permit. The designation by reference symbols of parts shown in the drawings of the scow have been retained unchanged wherever possible in the drawings of the car. It is here to be noted that the construction and equipment applied to a car of a city or interurban railway system operated preferably by electric traction, are equally applicable to freight cars drawn by steam power, and to auto-trucks, the modifications in parts being but slight and of such a nature that they would suggest themselves to any one skilled in the art.

The cargo space 4 is limited at its forward end by the front wall or bulkhead $4^a$, a part of which forms the front wall of the ascending branch $2^a$ of the conveyer trunk, while the rear end of said space is limited by the rear bulkhead $4^b$, a part of which forms the rear wall of the descending branch $2^c$ of the conveyer trunk 2. The car floors 8 at the bottom of the cargo space slope downward toward the lower branch of the conveyer trunk and its openings 15, from a line at each side at about mid-height between the bottom of the car and the top of the upper branch $2^b$ of the conveyer trunk. From the front and rear edges of each aperture 15 the floor of the car space slopes upward toward the front and the rear, as the case may be, forming between each pair of adjacent apertures 15 a body 17, having a prismatic, longitudinal, vertical section, the ridge or upper edge $17^b$ of which rises to the level of the sloping floors 8 at the two sides of the car.

The cargo may be taken in through an opening 24 leading to an internal chute 25, terminating in the boot 6 at one end of the car as in the case of the scow. In this event the cargo space is loaded by the conveyer buckets emptying their contents through apertures 19, the gates $19^a$ of which have been opened for that purpose, just as was described for the loading of the scow. This method of loading is especially applicable when the car is used as a local station for receiving waste material, in which case the hinged cover of the opening 24 is preferably replaced by removable hatch cover $24^a$ in which is fitted a smaller hatch $24^b$ with its own cover, as was shown and described in the case of the scow. Ordinarily the car will be loaded from a local loading station through openings 33, 33 in the roof or covering wall of the upper branch $2^b$ of the conveyer trunk. One of these openings 33 is provided directly over each aperture in the bottom wall of the upper branch $2^b$, each of which is directly over one of the openings 15 in the cover of the lower branch 2 of the conveyer. Loading from the discharge platform of a station may be accomplished by shoveling the waste material into the funnel-shaped mouth $34^a$ of a chute 34 (Fig. 15) the lower part of which is set into the neck or coaming $33^a$ of one of the openings 33 in the upper branch of the car, its cover 33$^b$ having been taken off. A flange or collar 34$^b$, rigidly secured around the lower part of chute 34 rests on the upper edges of the coaming 33$^a$ to make a tight joint therewith.

To discharge the car the gates 18 of the lower branch 2 of the trunk are opened, gates 19$^a$ of the upper branch 2$^b$ being closed. An opening 27 in the bottom of the upper branch 2$^b$ near its forward end, discharges when open, with a distributing box or chamber 27$^b$ built into the cargo space directly below the opening 27, its sides depending from and being secured to the bottom wall of trunk 2$^b$. The opening 27 is normally closed by a gate valve 27$^a$ which slides horizontally in guides depending from the bottom of the trunk 2$^b$, being operated by a rack and pinion, actuated by a hand wheel 27$^c$ projecting beyond the forward bulkhead.

A chute 38 slopes outwardly and downwardly from the lower part of each side of the box 27$^b$, projecting a short distance beyond the side of the car in the form of a nozzle 38$^a$ (Figs. 14 and 12). Pins or studs 38$^b$ projecting from the sides of said nozzle near its end, serve to make a detachable joint of the bayonet-clutch type, with extension joints 39 (Fig. 14) that are slipped over the outside of the nozzle 38$^a$ when the car is to be discharged. The removable chutes 39 may be carried on top of the car, lashed to the sides of the upper branch 2$^b$ of the trunk, or they may be kept at the discharging stations.

Two methods of driving the conveyer chains are illustrated in Figs. 11 and 12. In the one case the sprocket wheel 20 at the top of the descending branch 2$^c$ of the conveyer trunk receives the actuating impulses by gearing and shafts 20$^a$, 23$^a$, 23$^b$, 23$^d$, driven by a motor 23 depending from the bottom of the car and transmitting its power through a shaft 23$^f$ to the bevel wheel 23$^d$, all of which connections and driving mechanism are thoroughly well known. Another means for driving the conveyer involves making the sprocket wheel at the lower end of the descending chute 2$^c$ the driver. In this case the shaft 20 of said wheel is carried out to a short distance beyond the side by an extension 20$^b$ (Figs. 12 and 13) at the outer end of which the female member 20$^c$ of a clutch coupling is mounted. An auxiliary shaft 20$^d$ projecting from and actuated by machinery in the loading or discharging station, as the case may be, has slidably mounted on a feather at its outer end the male member 20$^f$ of the clutch coupling which is made to engage the female member 20$^c$ of said clutch, and is held in engagement therewith by the hinge bolts 20$^g$, when it is desired to drive the conveyer by means of power furnished by the station.

I claim:

A vehicle for waste material, comprising a body part constructed to provide a storage receptacle, an inclosed continuous conduit extending along the bottom, up each end and across the top of said storage receptacle, said storage receptacle having an inlet opening in the top thereof providing communication with said conduit, and an outlet opening in the bottom thereof providing communication with said passageway, an endless conveyer mounted in said conduit, and means for actuating said conveyer for carrying material along said conduit.

EDWARDS B. STUART.